US012095627B2

(12) United States Patent
Holtz et al.

(10) Patent No.: US 12,095,627 B2
(45) Date of Patent: Sep. 17, 2024

(54) PREDICT NEW SYSTEM STATUS BASED ON STATUS CHANGES

(71) Applicant: International Business Machines Corporation, Armonk, NY (US)

(72) Inventors: Juergen Holtz, Pleidelsheim (DE); Andreas Stay, Boeblingen (DE); Alexander Terekhov, Boeblingen (DE); Elena Lopez De Dicastillo, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/453,712

(22) Filed: Nov. 5, 2021

(65) Prior Publication Data

US 2023/0145526 A1 May 11, 2023

(51) Int. Cl.
*H04L 41/14* (2022.01)
*G05B 13/04* (2006.01)
(Continued)

(52) U.S. Cl.
CPC .......... *H04L 41/145* (2013.01); *G05B 13/048* (2013.01); *G06F 11/34* (2013.01); *H04L 41/149* (2022.05)

(58) Field of Classification Search
CPC ..... H04L 41/14; H04L 41/142; H04L 41/145; H04L 41/147; H04L 41/149; H04L 41/16;
(Continued)

(56) References Cited

U.S. PATENT DOCUMENTS

2006/0117027 A1\* 6/2006 Areddu .................. H04L 41/00
2006/0294238 A1\* 12/2006 Naik ..................... H04L 41/147
709/226

(Continued)

OTHER PUBLICATIONS

Hui, Linbo, et al. "Digital twin for networking: A data-driven performance modeling perspective." IEEE Network (2022). (Year: 2022).*

(Continued)

*Primary Examiner* — Vivek Srivastava
*Assistant Examiner* — William C McBeth
(74) *Attorney, Agent, or Firm* — Stephen R. Yoder

(57) ABSTRACT

A computer-implemented method for predicting an effect of an intervention on managed computing resources using a first system automation management system, comprising an automated operations controller and at least one automation agent is disclosed. The method comprises sending initial state data of the first system automation management system to a second system automation management system which is a functional duplicate of the first system automation management system, sending a status change command and a related expected response vector, equivalent to a result of the intervention to the second system automation management system, determining, by the second system automation management system, a predicted response vector of the managed computing resources in response to the received status change command, and responding, by the second system automation management system, with the determined response vector and a set of predicted actions derived therefrom.

20 Claims, 8 Drawing Sheets

(51) Int. Cl.
  *G06F 11/34* (2006.01)
  *H04L 41/149* (2022.01)
(58) Field of Classification Search
  CPC ............. H04L 41/0876; H04L 41/0883; H04L 41/0886; G05B 13/04; G05B 13/048; G05B 17/00; G05B 17/02; G05B 19/41885; G05B 15/00; G05B 15/02
  See application file for complete search history.

(56) References Cited

U.S. PATENT DOCUMENTS

| | | | |
|---|---|---|---|
| 2008/0027704 A1* | 1/2008 | Kephart ........... | G05B 19/41885 703/22 |
| 2008/0049013 A1* | 2/2008 | Nasle ................... | H04L 41/147 345/419 |
| 2009/0119077 A1 | 5/2009 | Norman | |
| 2014/0001847 A1* | 1/2014 | Khandelwal ....... | H02J 13/00004 307/11 |
| 2014/0379881 A1* | 12/2014 | Bradley ................ | H04L 41/147 709/221 |
| 2017/0286572 A1 | 10/2017 | Hershey | |
| 2017/0346684 A1* | 11/2017 | Ratkovic ............... | H04L 41/145 |
| 2018/0041400 A1* | 2/2018 | Ngoo .................... | H04L 41/147 |
| 2019/0197397 A1* | 6/2019 | Verma ..................... | H04L 41/12 |
| 2019/0306023 A1* | 10/2019 | Vasseur ................ | H04L 41/147 |
| 2020/0218239 A1* | 7/2020 | Guo .................... | H04L 41/0823 |
| 2020/0265329 A1 | 8/2020 | Thomsen | |
| 2021/0318670 A1* | 10/2021 | Cunningham ... | G05B 19/41855 |
| 2022/0014444 A1* | 1/2022 | Ramanathan ......... | H04L 41/147 |
| 2022/0263843 A1* | 8/2022 | Aslam ................... | H04L 41/145 |

OTHER PUBLICATIONS

Jagannath, Jithin, Keyvan Ramezanpour, and Anu Jagannath. "Digital twin virtualization with machine learning for IoT and beyond 5G networks: Research directions for security and optimal control." Proceedings of the 2022 ACM Workshop on Wireless Security and Machine Learning. 2022. (Year: 2022).*

Taboga, Marco (2021). "Vectors and matrices", Lectures on matrix algebra. https://www.statlect.com/matrix-algebra/vectors-and-matrices. (Year: 2021).*

Saad, Ahmed, Samy Faddel, and Osama Mohammed. "IoT-based digital twin for energy cyber-physical systems: design and implementation." Energies 13.18 (2020): 4762. (Year: 2020).*

"Method for simulation of system automation within a sysplex using real policy without existance of the real hard- and software", An IP.com Prior Art Database Technical Disclosure, IP.com No. IPCOM000137646D, IP.com Electronic Publication Date: Jun. 27, 2006, 6 pages.

Disclosed Anonymously, "A Lightweight Simulator for Policy Based Failover", An IP.com Prior Art Database Technical Disclosure, IP.com No. IPCOM000208523D, IP.com Electronic Publication Date: Jul. 11, 2011, 6 pages.

Kher, Sameer, "Simulation for The Solutions Digital Twin Ecosystem", Ansys Advantage, Issue 1 | 2017, 4 pages.

McGregor, Ian, "Automation system simulation and virtual controls testing—what you may be missing", Jul. 31, 2020, 17 pages, <https://www.isa.org/intech-home/2020/july-august-2020/features/automation-system-simulation-and-virtual-controls>.

* cited by examiner

PREDICT NEW SYSTEM STATUS BASED ON STATUS CHANGES

BACKGROUND

The present invention relates generally to a computer-implemented method for predicting an effect of an intervention on managed computing resources, and more specifically, to a computer-implemented method for predicting an effect of an intervention on managed computing resources using a first system automation management system, comprising an automated operations controller and at least one automation agent. Still further, a related predicting system is presented for predicting an effect of an intervention on managed computing resources, and a computer program product.

One of the goals of modern IT infrastructure operation is to automate operation as much as possible. A system automation product is thereby used to manage an IT (information technology) environment consisting of one or multiple systems and containing multiple automated resources which may also have dependencies among each other. The automation system typically manages workloads and/or resources locally as well as remotely. It comprises a component—e.g., an automation manager—that supervises the state of the environment and another component(s)—e.g. an automation agent—that tracks the state of a single or multiple systems in that computing environment and executes orders and eventually takes action to correct undesired states. This may also be a typical set up in cloud computing environments.

SUMMARY

In one aspect of the present invention, a method, a computer program product, and a system for predicting an effect of an intervention on a managed computing resources using a first system automation management system including an automated operations controller and at least one automation agent includes: sending initial state data of the first system automation management system to a second system automation management system which is a functional duplicate of the first system automation management system; sending a status change command and a related expected response vector, equivalent to a result of the intervention to the second system automation management system; determining, by the second system automation management system, a predicted response vector of the managed computing resources in response to the received status change command; and responding, by the second system automation management system, with the determined response vector and a set of predicted actions derived therefrom.

According to one aspect of the present invention, a computer-implemented method for predicting an effect of an intervention on managed computing resources using a first system automation management system, comprising an automated operations controller and at least one automation agent may be provided. The method may comprise sending initial state data of the first system automation management system to a second system automation management system which is a functional duplicate of the first system automation management system, sending a status change command and a related expected response vector, equivalent to a result of the intervention to the second system automation management system, determining, by the second system automation management system, a predicted response vector of the managed computing resources in response to the received status change command, and responding, by the second system automation management system, with the determined response vector and a set of predicted actions derived therefrom.

According to another aspect of the present invention, a predicting system for predicting an effect of an intervention on managed computing resources may be provided. The system may comprise a processor and a memory, communicatively coupled to the processor, wherein the memory stores program code portions that, when executed, enable the processor, to send initial state data of the first system automation management system to a second system automation management system which is a functional duplicate of the first system automation management system and send a status change command and a related expected response vector, equivalent to a result of the intervention to the second system automation management system.

The processor may also be enabled to determine, by the second system automation management system, a predicted response vector of the managed computing resources in response to the received status change command and to respond, by the second system automation management system, with the determined response vector and a set of predicted actions derived therefrom.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating, or transporting the program for use, by, or in connection, with the instruction execution system, apparatus, or device.

DETAILED DESCRIPTION

Figure 1:
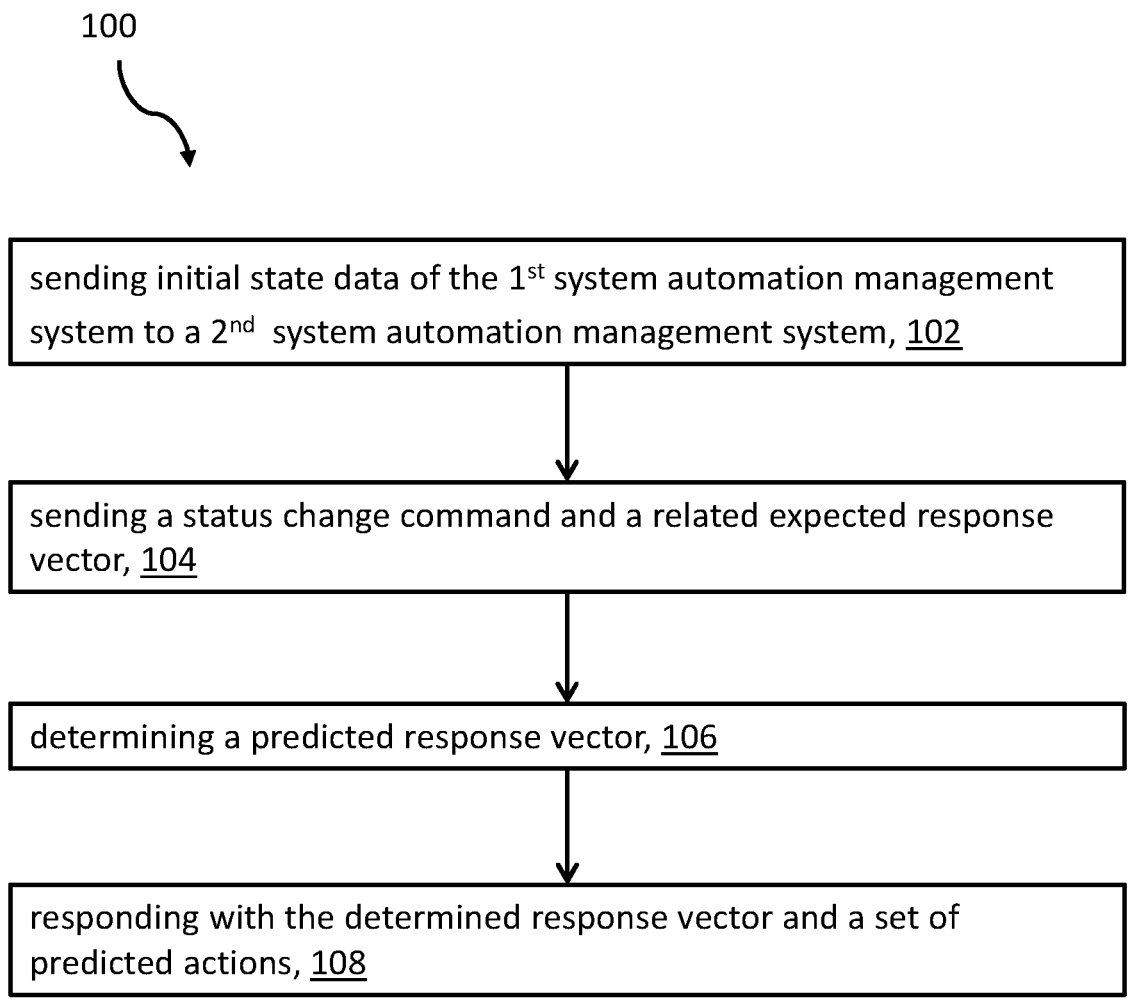
FIG. 1 is a flowchart of a first embodiment computer-implemented method for predicting an effect of an intervention on managed computing resources using a first system automation management system, comprising an automated operations controller and at least one automation agent.

Due to the complexity of the systems involved as well as their dependencies, human operators may not oversee all potential consequences when starting or stopping an automated resource in such a complex environment. This is because there may be no complete and deterministic prediction of what would happen as the result of such a request. It is not always clear how the IT environment comprising the computing systems as well as other resources would look like after issuing a request or command such as a reconfiguration command. The automation manager receiving a request typically determines the set of direct orders to be sent to the affected automation agents. But there does not appear to be any conventional way to predict the response of the automation agents as the result of receiving and executing such commands.

For example, in a given scenario, the automation manager may determine that a specific application or service would have to be stopped. So, it would send a stop request to the automation agent that is responsible for a specific application. Now, several things may happen, like, (a) the automation agents cannot be reached, (b) the automation agent may be unable to send the stop request to the application, but (c) the application does not respond, or the application may be stopped but then may run into an error. Or in the good case, the steps happen as expected.

Because computing resources can depend on each other, it may also be hard for the operator to understand how the computing environment will look like after executing a given request or an unexpected status change. Thus, the operator would have a need for being able to test certain command or orders without effecting the real-world components like applications and/or other resources.

The present invention may be a system, a method, and/or a computer program product. The computer program product may include a computer readable storage medium (or media) having computer readable program instructions thereon for causing a processor to carry out aspects of the present invention.

In the context of this description, the conventions, terms and/or expressions that may be used are describes below.

The term "intervention" may denote in action—e.g., in form of a command—to change a status of a computing resource. Examples may be "starting a resource", "stopping a resource" or a reconfiguration of a resource, redirecting network or data traffic, e.g. to another storage system. On the other side, the intervention may be an unexpected status change of a computing resource, like a network failure, a failed storage system or, a broken power supply, just to name some examples.

The term "managed computing resource" may denote an IT (information technology) resource—typically a plurality thereof—which functioning may be controlled by another system or application, i.e., a system automation management system or a related automated operations controller or—in short—automation controller. Hence, in order to manage and control the computing resource typically, no human activity may be required because all control and surveillance tasks may be handed by the automation controller.

The term "system automation management system" may denote—at least in parts—the just mentioned automation controller or—in other words—the automated operations controller. The system automation management system may be implemented completely in software or a combination of hardware and software components. Its purpose may be to control a plurality of computing resources of any kind: e.g., software programs, software services, network controller, storage devices, virtual machines, complete computer systems, cloud computing systems and the like. The system automation management system typically collects operation parameter values—e.g., usage or load data of the computing resources—and may send configuration or reconfiguration commands to the computing resources. It may also start another resource if a first parallel resource may be overloaded.

In the concept proposed here, there may be two automation controllers: an active one and a passive one. The active automation controller may be used to manage and control the physical computing environment and all of its resources. The passive automation controller—which may also be denoted as digital twin (in particular, of the active automation controller)—may be in a shadow mode with no direct influence on the computing environment and all of its resources. However, it may act like a mirror system and may be used to simulate the computing environment and all of its resources. Thus, the second automation controller of the second system automation management system may be an ideal environment to test and determine potential status changes to the real computing environment and all of its resources Also, a couple of other aspects shall be discussed here: The passive automation controller may, e.g., receive a simulation request for changing the status of a resource or an attribute of a group, and it also may take a "response vector" with the simulated response(s) from the—also simulated—agent(s). From the current initial status of the data model, the passive automation controller can already predict the order he would send to the agent(s). But with the "response vector" he can now also simulate the new status of all resources in the entire data model using that response. The result may be presented back to the operator.

Similarly, the passive automation controller may receive a simulated status change of a resource, pretending that this resource failed. It also may take a "response vector" with the simulated response(s) from the agent(s) to its reaction as result of that status change. When the passive or second automation controller may evaluate what the reaction should be, he may send an order to the agent(s). The "response vector" may allow the second automation controller to simulate the new status of all resources in the entire data model using that response. The result may be presented back to the operator.

The "response vector" may be a single status vector for a set of resources. This way, a single cycle may be simulated. To simulate multiple cycles—i.e., order1→responses 1→order2→responses 2—it could be even a matrix of stacked vectors where each vector i represents the response on the i-th order that the digital twin is simulating as the result of the i-th minus first response.

For all practical purposes, the response vector may also support typical defaults, like. e.g., assuming normal behavior for all resources but those that should be simulated in a specific form. This may avoid that a user has to create that vector manually.

The term "automation agent" may denote so to speak the front-end of the system automation management system automation controller into the direction of the computing resources. The automation agent may be located comparably close to a resource to be controlled. It may also function as an interface between the automation controller and a resource in order to send commands from the automation controller to the controlled resource. However, the agent may also be modified in comparison to a normal state-of-the-art agent in that an operator may use the agent to send status changes via the agent to the second automation controller although the status changes would not happen to the real IT environment, i.e., the real computing devices. This may happen in a way that the artificially provoked status changes would be sent for the second system automation system, i.e., the second automated operations controller. The first controller would only receive the real status changes coming from the real computing resources.

The term "initial state data" may denote a snapshot of data for a given point in time. The data may describe the status of the resources controlled by an automation controller for that given point in time.

The term "functional duplicate" may denote that the second system automation management system may have at least the same functionalities and behaviors as the first system automation management system. However, the second system automation management system does not have to be completely identical—i.e., a copy—of the first system automation management system. Moreover, the second system automation management system may be implemented completely differently and with additional functionality. One of these additional functionalities may comprise a simulation or prediction of assumed automation agents and/or their behavior.

The term "status change command" may denote a signal to be sent to the computing resource in order to change its status. One example may be to start an application so that it status may change from "inactive" to "active."

The term "expected response vector" may denote data describing a state of one or more computing resources after having received a specific command affecting the operational status of the computing resource. The expected response vector would describe an expectation for the status of a resource by an operator. The vector may be a single scalar value (e.g., "off," "on," "failed," "full functioning") or a more complex data structure describing different aspects of the computing resource, e.g., over time.

The term "predicted response vector" may denote data describing the state of one or more computing resources from the perspective of the second system automation management system, after it has received the state change command. The predicted response vector may also be a predicted response matrix, or—more general—predicted response tensor.

The term "determined response vector" may also denote a predicted response vector, or determined response tensor in the general case.

The term "predicted action" may denote a command or another activity in order to avoid critical situations for one or more computing resources. It may prevent an overload of a computing resource and thus a potential nonfunctioning of the respective computing resource or any other activity by the operator or the automation controller in order to ensure a proper function of the respective computing resource. It may also be just the action that would occur directly or indirectly for a particular computing resource as the result of a status change command for this or another, related computing resource.

Some embodiments of the present invention may include one, or more, of the following features, characteristics and/or advantages: (i) basically, it may enable a more robust operation of computing resources of any kind; (ii) operation commands to more or less complex computing infrastructures may have unexpected outcomes; (iii) unexpected outcomes may be avoided using the prediction mechanism described here; and/or (iv) the forward-looking determination (or simulation) can reduce human errors in operating complex computing resources, like, cloud computing environments;

Some embodiments of the present invention may include one, or more, of the following features, characteristics and/or advantages: (i) it may also be used for training purposes and help human operators to detect unseen dependencies and therefore improve the automation policies; (ii) the training and support can be achieved without it affecting the physical operation of the computing resources because no direct or real tests may be run against the physical (or virtually organized) computing resources; (iii) one may say that all commands and potential status changes may be executed in a sort of sandbox environment for the automation controller (or automated operations controller) or system automation management system; (iv) this may be achieved by the second system automation management system which may predict the response vector—in particular, for a hypothetical command to the real, physical resources—as well as predicted actions—in particular, actions in order to avoid a malfunctioning of the computing environment; (v) the sandbox environment may allow implementing the concept of a digital twin for a secure management of complex computing system; (vi) it may exactly predict what reaction would occur in response to a status change to a computing resource; (vii) it may also allow to completely predicting what would happen under a given set of assumptions, if a resource would be requested to stop operation; (viii) the digital twin may be able to perform a complete "cycle" through a request that may include groups of programs and it may also consider the responses of an agent, like, e.g., status changes for all of the resources affected by the request; (ix) both, the digital twin and its original (i.e., the active automation controller) may have a deterministic way to act under certain given conditions; (x) the difference may be that any change in the original's data model may directly influence the way it may acts in the real world environment, while although the digital twin may use the very same data model to begin with, any change in that data model may only lead to simulated results.

According to a permissive embodiment of the method, the intervention may be a status change—in particular, at least one status change—to the managed computing resources or a detected unexpected result from the at least one automation agent of the first systems automation management system. So, with the here propose system, an administrator may test a variety of different status changes "in vitro" without compromising or affecting in active trusted execution environment at all. Simulations and scenario planning activities in light of potential failures, upgrade plans or other system changes may be test-wise determined without any active influence on the live computing environment.

According to one advantageous embodiment of the method, the expected response vector and/or the predicted response vector may be indicative for a current or future behavior of a set of resources—which may, in particular, also be only one resource—of the first system automation management system. Thus, not only the intervention, i.e., the status change may be used as input for a test of the behavior of the computing infrastructure but also an expected response vector which may be expected by the system administrator and/or testing person.

According to a useful embodiment of the method, a managed computing resource may be at least one selected out of the group comprising a process—in the sense of a series of executable instructions—being executed on a hardware device, a hardware device and/or a sub-component thereof. Examples for a sub-component may be an adapter, a controller, a network device, a storage device (physical or virtual, in particular, in the environment of software defined storage), a coprocessor, a hardware security module, a virtual machine, and execution container, a CPU/CPC (Central Processing Complex), a logical partition (LPAR), a memory controller, a memory board, and so on.

According to an advantageous embodiment of the method, the initial state data may be derived from a snapshot of a current status of the first system automation management system. Such snapshot data may be collected by the one or more agent of the first system automation management system. Hence, no artificial but always current status data of a plurality of computer components/resources managed and controlled by the first system automation management system may be collected—representing the snapshot—and transferred to the second system automation management system.

According to a preferred embodiment of the method, the set of predicted actions may be indicative for operational commands (or orders) to the managed computing resources. Such predicted actions may also be interpreted as recommendations how to manage and control the set of resources if a certain condition—e.g., responsive to the intervention—may happen.

According to an advanced embodiment of the method, the expected response vector may be a NULL vector. I.e., no expectations or respective vectors may be transmitted to the second system; only the command will be transmitted to the second system automation management system. In this case, for simplicity purposes, the second automation controller may assume that the agents' responses would be "normal" relative to the orders sent to them. In other words, if one would expect a resource to become inactive, the agent's response would be that the resource is inactive, as opposed to "ended in error" or "still active" (which is equivalent to no response from the agent).

According to a further developed embodiment of the method, the expected response vector and the determined response vector may each be a matrix representing different pretended or final outcomes for each resource, wherein each element of the matrix relates to a resource and optionally to a prediction cycle. Thus, the prediction may represent a time-series of development steps the computing resource(s) may undergo. E.g., the storage system may reach a predefined limit of usage (e.g. 90% full) and shortly after the capacity may be reached; hence the device may produce a write error in which consequence an application may fail to function. Or, a service in an application using a service-oriented architecture may be out of service; therefore, at least parts of the function of an application may not work for a user, and so on.

According to one advantageous embodiment of the method, the first system automation management system may continue operation without any impact from the sending the status change and the related response vector to the second system automation management system. Hence, the first system automation management system may be completely decoupled from the second system automation management system, at least in certain time intervals. The total system may also work without the functioning second system automation management system. Basically, the first system automation management system does not need the second system automation management system at all. This may also be valid vice versa after the second system automation management system may have received initial status data.

According to another enhanced embodiment, the method may comprise streaming continuously the current state of the first system automation management system to the second system automation management system. This way, the second system automation management system may always make its assumptions and prediction on the latest status of the actual computing system which is managed and controlled by the first system automation management system. No extra transmission of the initial status data from the first system automation management system may be requested or required by the second system automation management system because they are already available.

According to another advanced embodiment of the method, the response vector may be a matrix—e.g., sequence of vectors—representing a sequence of response vectors in time. Also this way, a development of the system over time may be tested and predicted and also a sequence of recommendations in time can be derived from it.

In the following, a detailed description of the figures will be given. All instructions in the figures are schematic. Firstly, a block diagram of an embodiment of the inventive computer-implemented method for predicting an effect of an intervention on managed computing resources using a first system automation management system, comprising an automated operations controller and at least one automation agent is given. Afterwards, further embodiments, as well as embodiments of the predicting system for predicting an effect of an intervention on managed computing resources will be described.

FIG. 1 shows a block diagram of a preferred embodiment of the computer-implemented method 100 for predicting an effect of an intervention on managed computing resources—which may have dependencies among each other and which are mainly execution processes—using a first system automation management system comprising an automated operations controller—sometimes also denoted as automation manager—and at least one automation agent. The method comprises sending, 102, initial state data of the first system automation management system to a second system automation management system which is a functional duplicate of the first system automation management system. Thereby, the second system automation management system works without impacting the first system automation management system during its regular operation.

The method also comprises sending, 104, a status change command and a related expected response vector, equivalent to a result of the intervention to the second system automation management system and determining, 106, by the second system automation management system, a predicted response vector—i.e., a sort of simulation—of the managed computing resources in response to the received status change command—and potentially an expected, i.e., predicted response vector. The expected response vector can thereby be a reaction to the interaction(s) between the second system automation management system and simulating automation agent(s).

The method 100 comprises furthermore, responding, 108, by the second system automation management system—i.e., a second automated operations controller—in particular, to the first second system automation management system—i.e., the first automated operations controller—with the determined response vector and a set of predicted actions—i.e., recommended—derived therefrom. Thereby, the response can be displayed to an operator. He would receive an expected result of the command which was—however—not released to the physical world of the applications and resources.

Figure 2:
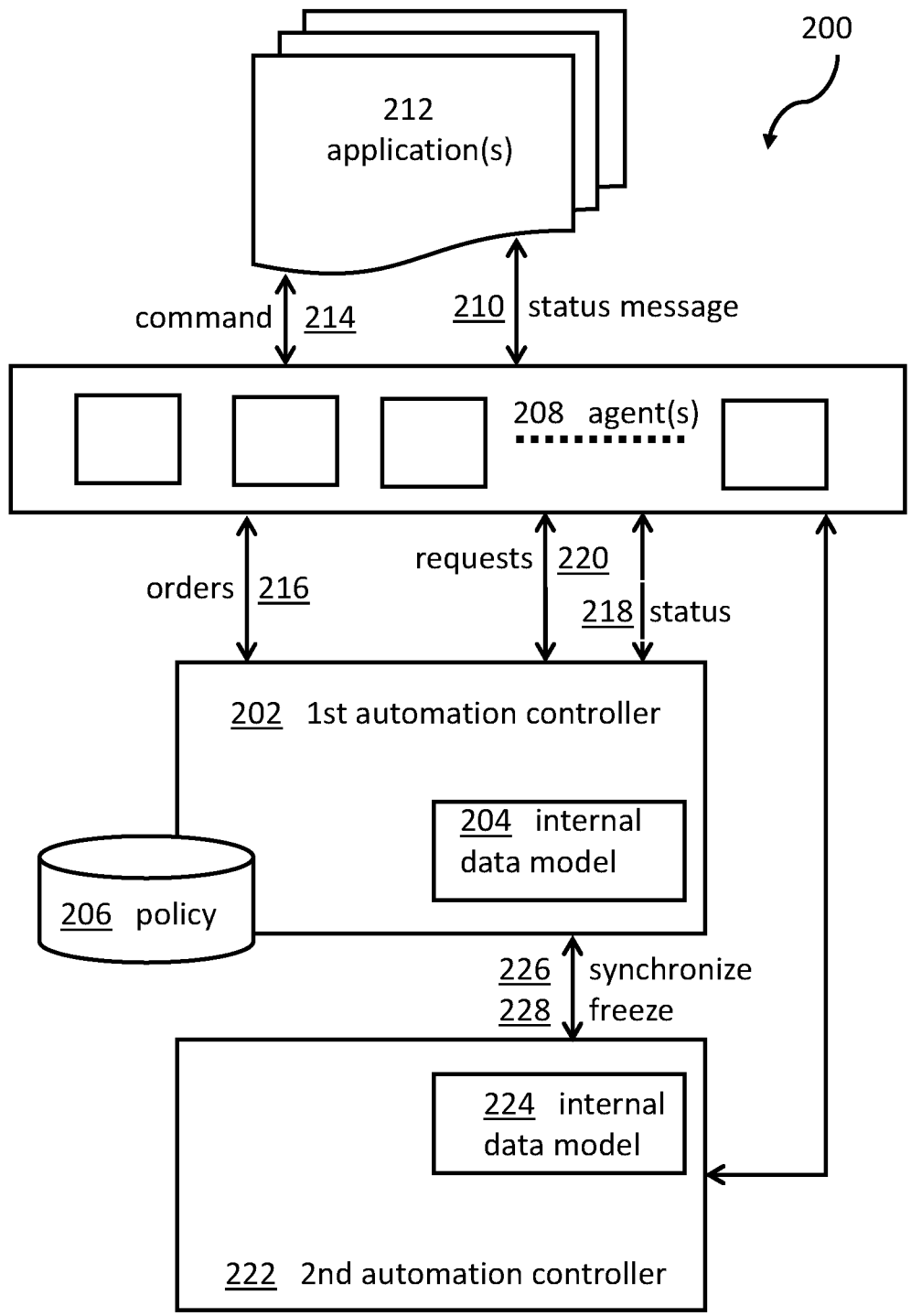
FIG. 2 is a block diagram illustrating the first embodiment method with involved components.

FIG. 2 shows a block diagram 200 of an embodiment with involved components. In the center of systems management automation system is the first automation controller 202 representing the first system automation management system. It can share its own internal data model 204 and comprises a storage 206 for storing a series of policies, including upgrade policies. The agent or agents 208 collect or trap status messages 210 from the application(s) 212. On the other side, the agent(s) 208 can send orders 214 to be executed by, e.g., the application or configuration systems of the application(s) or devices. The order 216 (which can be a series of commands) originates from the first automation controller 202. They are passed by the agents 208 to the applications 212.

Additionally, status information 218 is sent from the agent 208 to the first automation controller 202 or, requests 220 come from the applications or other resources via the agents 208 to the first automation controller 202.

Furthermore, a second automation controller 222 is shown, comprising its own internal data model 224. Function wise, the second automation controller 222 corresponds to the functioning of the first automation controller 202. However, the second automation controller 222 may also simulate the behavior of agents which may be equivalent to the agents 208.

As described above, the internal data models 204, 224 are synchronized, 226, by sending initial status data from the internal data model 204 to the internal data model 224. In a next step, a data exchange between the first automation controller 202 and the second automation controller 222 is frozen, 228, and the second automation controller 222 determines a potential response from the agents 208 if a certain command (i.e., order) would be sent to the applications/resources 212. However, actually, such command would not be sent via the agents 208 to the resources 212 but would only be sent from the first automation controller 202 to the second automation controller which, in return, would test (i.e., simulate) a potential effect that the command would have to the resources 212. Hence, the second automation controller 222 would evaluate requests and status changes that could happen in the real world of the applications and resources 212. The second automation controller 222 would also recommend preventive actions in order to keep the applications and resources 212 in a stable state. For this, the second automation controller 222 can, in a loop, decide and pretend changes based on a simulated response matrix. Hence, the second automation controller 222 is enabled to test certain future statuses of the applications and resources 212, although the applications and resources 212 had never received the command for a status change. Such a prediction by the second automation controller 222 would be possible for predicted status changes for all affected resources and its mutual dependencies.

In other words: In a steady state, the internal data model 204 of the active or first automation controller 202 is synchronized with that of the second automation controller 222 (data model 224 of the digital twin). This could be done synchronously for every update, in batches, or just once before an actual simulation is started. Whenever a simulation is requested, the pre-condition on the second automation controller 222 side is that both internal data models (204, 224) match. At some point, an operator wants to simulate an action (changing the desired status of a resource) or an event (changing the observed status of a resource). The operator interacts with the agent to initiate the simulation.

The operator tells the agent what simulation the operator wants to perform and optionally passes a simulated response matrix to it. In a simple variation, the response matrix can be a single vector (or, even a NULL vector) with one element for each resource with a pretended outcome for this simulation. In a more complex variation, the response matrix could also be a list of vectors stacked next to each other representing different pretended interim or final outcomes for each resource in the vectors.

The simulation request and the response matrix is then passed on to the second automation controller 222. Next, the second automation controller (i.e., the digital twin) will freeze, 228, its copy of the data model to avoid side effects due to ongoing changes that can happen at the same time in the active environment. Finally, the simulation can commence.

The simulation is performed as an evaluate-act-loop which continues to run until the second automation controller 222 detected that a stable status has been reached and no more actions needs to be sent to any of its agents. This evaluate-act-loop will be explained in more detail below. The point to take away on this step is that every step in this loop evaluates the current simulated observed states and possible actions derived from these states to adjust these resources' observed status so that they get closer to their desired status. The actions and the simulated states are saved in each step, so that they can be later returned to the operator. The evaluate-act-loop terminates, when the second automation controller cannot find any action to get closer to the resources' desired status.

Once the evaluate-act-loop finishes, the saved actions and simulated outcomes will be collected and united and returned to the operator. The format of the result table will also be shown below. In essence, for all resources that were affected by the simulation (a subset of all resources managed by the automation), the actions that the second automation controller 222 has issued and all the simulated status outcomes are listed. Hence, the operator understands the final simulated status of every affected resource and what is started or stopped on behalf of the simulation request.

Finally, the data model freeze is revoked, and synchronization may resume for subsequent simulation requests.

Figure 3:
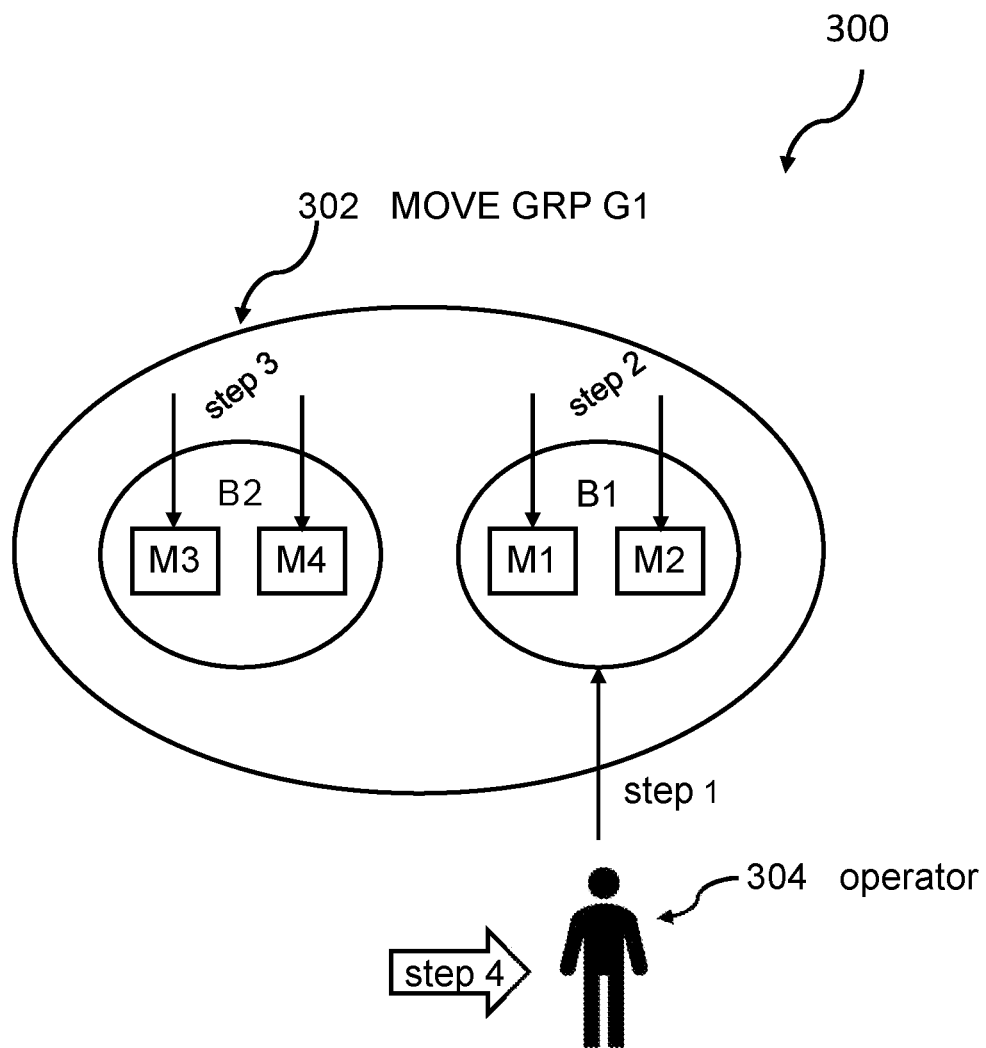
FIG. 3 is a simple simulation of an operator's request.

FIG. 3 shows a simple simulation 300 of an operator's 304 request. There exist two groups B1 and B2 that form the MOVE group G1 302. The MOVE group is used to specify that exactly one of the groups B1 and B2 must always be available.

Each group consists of multiple resources that must be available, so the group can be considered as being available too. If the available group is going down, the automations controller performs the required steps to ensure that the other group takes over.

As shown in table 1, currently, the MOVE group G1, as well as the group B1 is available and also its members M1 and M2 (i.e., computing resources). Because B1 is available there is no need to have group B2 available too and so B2 and its members M3 and M4 can be stopped and made unavailable.

TABLE 1

Resource status listing.

| resource | current observed status |
|---|---|
| G1 | available |
| B1 | available |
| M1 | available |
| M2 | available |
| B2 | unavailable |
| M3 | unavailable |
| M4 | unavailable |

Now, the operator 304 intends to simulate what will happen when the operator sends the request to stop group B1 (step 1). The second automation controller (the digital twin)

gets this simulation request and, because it knows the current state of the real environment in its own data model, it is able to perform the required steps without affecting the real environment. In step 1, it determines that two additional actions are required to stop B1, stopping M1 and M2. After simulating these actions and updating the data model it determines that there is a dependency to the MOVE group G1 302 and that at least one of the contained groups must be available. So, it determines in step 2 that the group B2 must be started and through the dependency chain that M3 and M4 must be started too. In step 3, those start actions are simulated and a stable state of the environment is reached as all defined requirements are fulfilled—G1 is available, because B1 or B2 is available—now B2.

In step 4, the second automation controller returns the determined actions including the new observed status of each affected resource to the operator and the operator gets a comprehensive insight what will happen if the request is performed against the real environment. This is summarized in table 2 as follows:

TABLE 2

Resource action report.

| resource | determined action | new observed status |
|---|---|---|
| G1 | n/a | available |
| B1 | stop | unavailable |
| M1 | stop | unavailable |
| M2 | stop | unavailable |
| B2 | n/a | available |
| M3 | start | available |
| M4 | start | available |

Also, as a summary of the above, the following flow will be executed:

step 0: get initial states by the second automation controller (AC);

step1: operator issues "stop request" for group B1;

the evaluation step 1 is done→Stop B1;

first set of actions is determined, i.e., stop members M1 and M2 the AC issues first set of actions as determined in 1;

evaluation step 2 is done→start B2;

next set of actions is determined, i.e., start members M3 and M4;

the AC issues next set of actions as determined in 2;

stable status reached; no further evaluation needed; and the AC returns a table of actions and resulting states for the given request.

In another example, the same MOVE group policy, as shown before, is used. In this scenario, the operator 304 wants to get a better understanding what will happen in the real environment if a resource encounters a specific status change, in this case, the failure of the resource M1. The operator 304 is interested into seeing how the system is reacting to this failure and if everything is in place to mitigate this issue in the real environment.

Table 3 defines the current status of the real environment. In step 1, the operator 304 sends the simulation request for the status change. As before, the second automation controller (AO) picks up that request and starts the simulation without affecting the real environment. It determines that the requirements for the group B1 can no longer be satisfied and that B1 has to be stopped. To stop the group B1 the additional action to stop member M2 is needed.

After simulating these actions and updating the data model, the second AC determines that there is a dependency to the MOVE group G1 302 and that at least one of the contained groups must be available. So, it determines in step 2 that the group B2 must be started and through the dependency chain that M3 and M4 must be started too. In step 3, those start actions are simulated and a stable state of the environment is reached as all defined requirements are fulfilled—i.e., G1 is available, because B1 or B2 is available—now B2.

In step 4 the second AC returns the determined actions including the new observed status of each affected resource to the operator 304 and the operator 304 gets a comprehensive insight what would happen if this status change occurs in the real environment. This is summarized in table 3, below.

TABLE 3

Resource action report.

| resource | determined action | new observed status |
|---|---|---|
| G1 | n/a | available |
| B1 | n/a | failure |
| M1 | n/a | failure |
| M2 | stop | unavailable |
| B2 | n/a | available |
| M3 | start | available |
| M4 | start | available |

Also as a summary of the above, the following flow will be executed:

step 0: second AC gets initial states;

operator simulates failure status for member M1;

the evaluation step 1 is done □ stop B1;

first set of actions is determined, i.e., stop member M2;

the second AC issues first set of actions as determined in 1;

evaluation step 2 is done □ start B2;

next set of actions is determined, i.e., start members M3 and M4;

the second AC issues next set of actions as determined in 2;

stable status reached; no further evaluation necessary;

the second AC returns a table of actions and resulting states for the given request.

Figure 4:
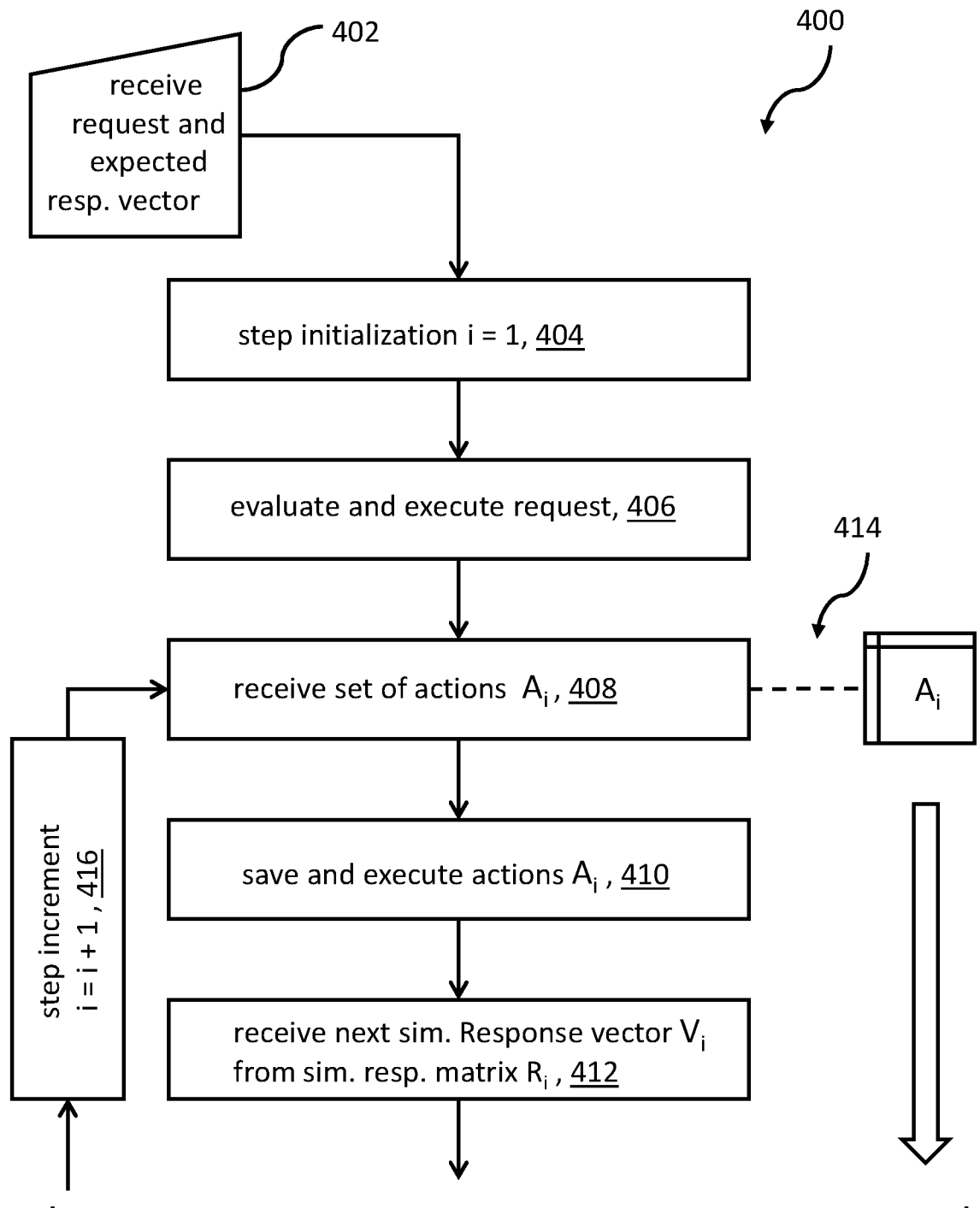
FIG. 4 is a first part of a flowchart illustrating an exemplary flow of details of a second embodiment method.

FIG. 4 is a first part 400 of a flowchart illustrating an exemplary flow. The simulation is done within an evaluate-act loop as introduced earlier (compare FIG. 3). The flow starts with receiving, 402, the simulation request and the simulated response matrix R. The step variable, i, is initialized, 404, and will be incremented. 416, by 1 for each iteration. Before the loop is entered, the simulation request needs to be evaluated, 406. It could be the change of the desired status of a resource or the change of the observed status of a resource. As a result, a first set of actions is determined.

The loop begins by receiving, 408, the actions A; (compare matrix 414). Next, the actions A; are saved. 410, so that they can later be collected into the result table and the second AC operates as if to execute them. Next, the simulated responses from the agent are prepared. The simulated response vector $V_i$ is received, 412, from the response matrix $R_i$. The flow will be continued in FIG. 5.

Figure 5:
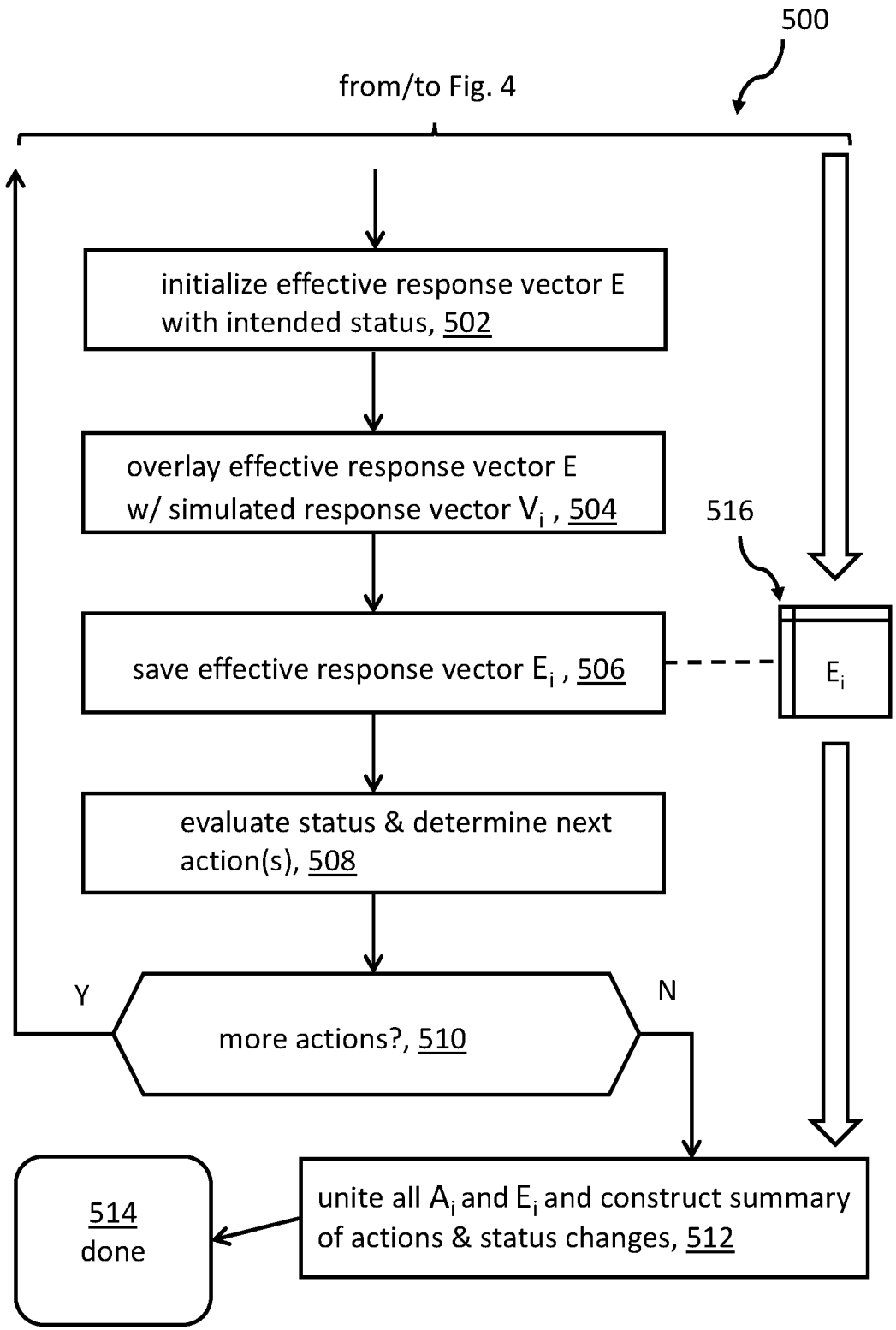
FIG. 5 is a second part of a flowchart illustrating an exemplary flow of details of the second embodiment method.

FIG. 5 is a second part 500 of the flowchart illustrating the exemplary flow. Continuing from FIG. 4, an effective response vector is created and initialized, 502, with the normal, expected output of an action. For instance, if a resource is started, it is expected to be available afterwards.

As a next step, the effective response vector is overlaid, 504, by the simulated response vector $V_i$ to update the normal expected output with what the operator wants to pretend the status should be. The effective response vector is then saved, 506, so that it can later be collected into the result table 516 (Effective Responses, $E_i$, see below in FIG. 6). Furthermore, the current (simulated) observed status is evaluated, 508, and the next set of action(s) is determined. If there are more actions to be executed—determination 510, case "Y"—the step variable, i, is incremented (compare FIG. 4) and the loop starts from the beginning (see FIG. 4).

When there are no more actions to execute—determination 510, case "N"—a stable state has been reached. Now all the actions and all the effective responses are united, 512, and transformed into the result table that will be returned to the operator. The process ends at 514.

Figure 6:
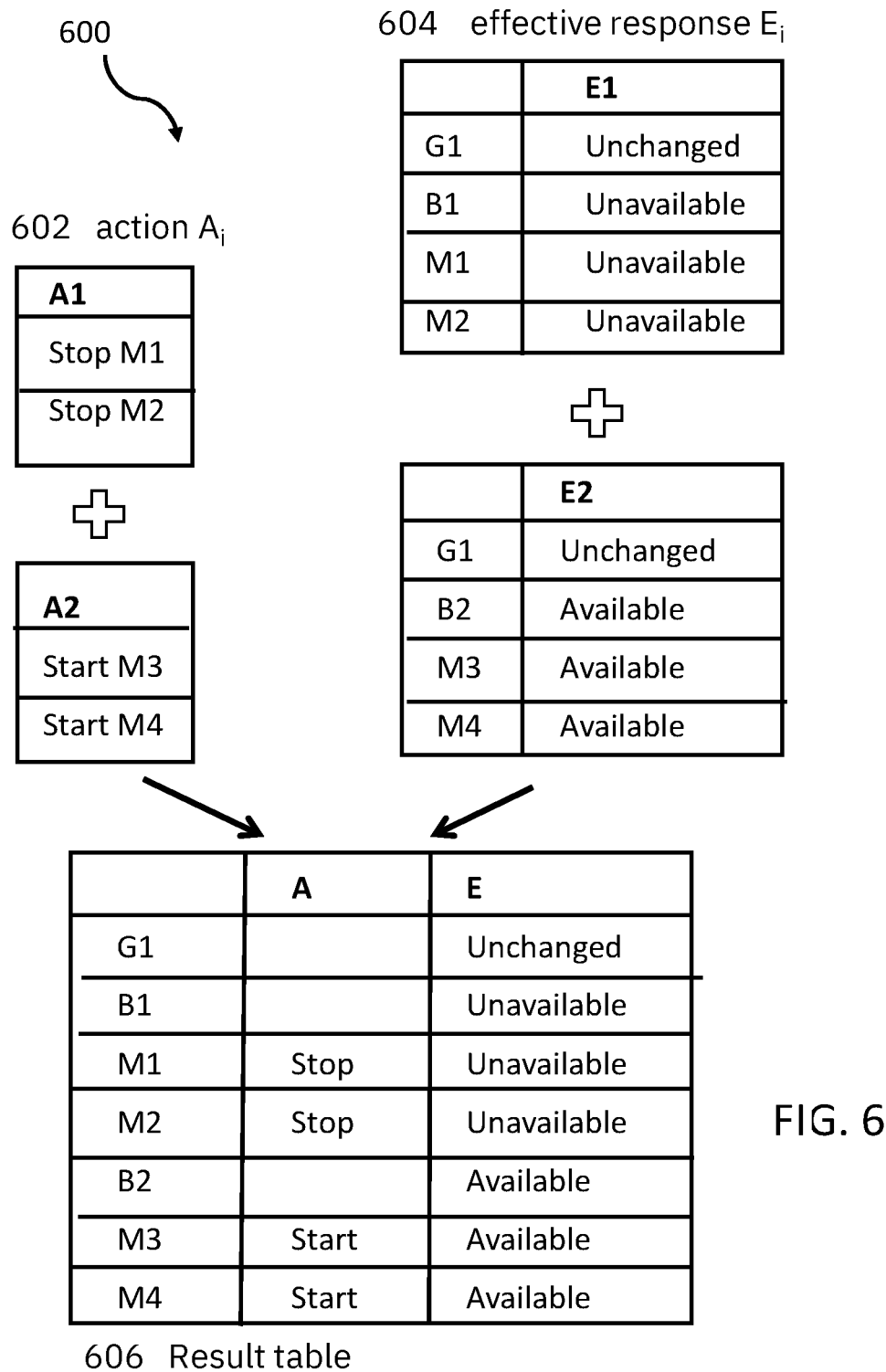
FIG. 6 is a diagram illustrating how the actions and effective responses may be collected and united to form the result table that is returned to the operator according to an embodiment of the present invention.

FIG. 6 shows a diagram 600 illustrating how the actions 602 and effective responses 604 will be collected and united to form the result table 606 that is returned to the operator.

Within each step, the actions $A_i$ 602 and the effective responses $E_i$ 604 are determined. If there are two iterations through the evaluate-act-loop, there would be two vectors of each of these types. In general, for n iterations through that loop, there would be n vectors of each of these types.

The result table 606 is then created by first merging the actions $A_i$ 602 and secondly by merging the Effective Responses $E_i$. The merge process ensures that the resources that are affected by this simulation have common slots for both resulting vectors. Finally, the resulting vectors for the actions and effective responses are stacked together to form the result table 606.

Figure 7:
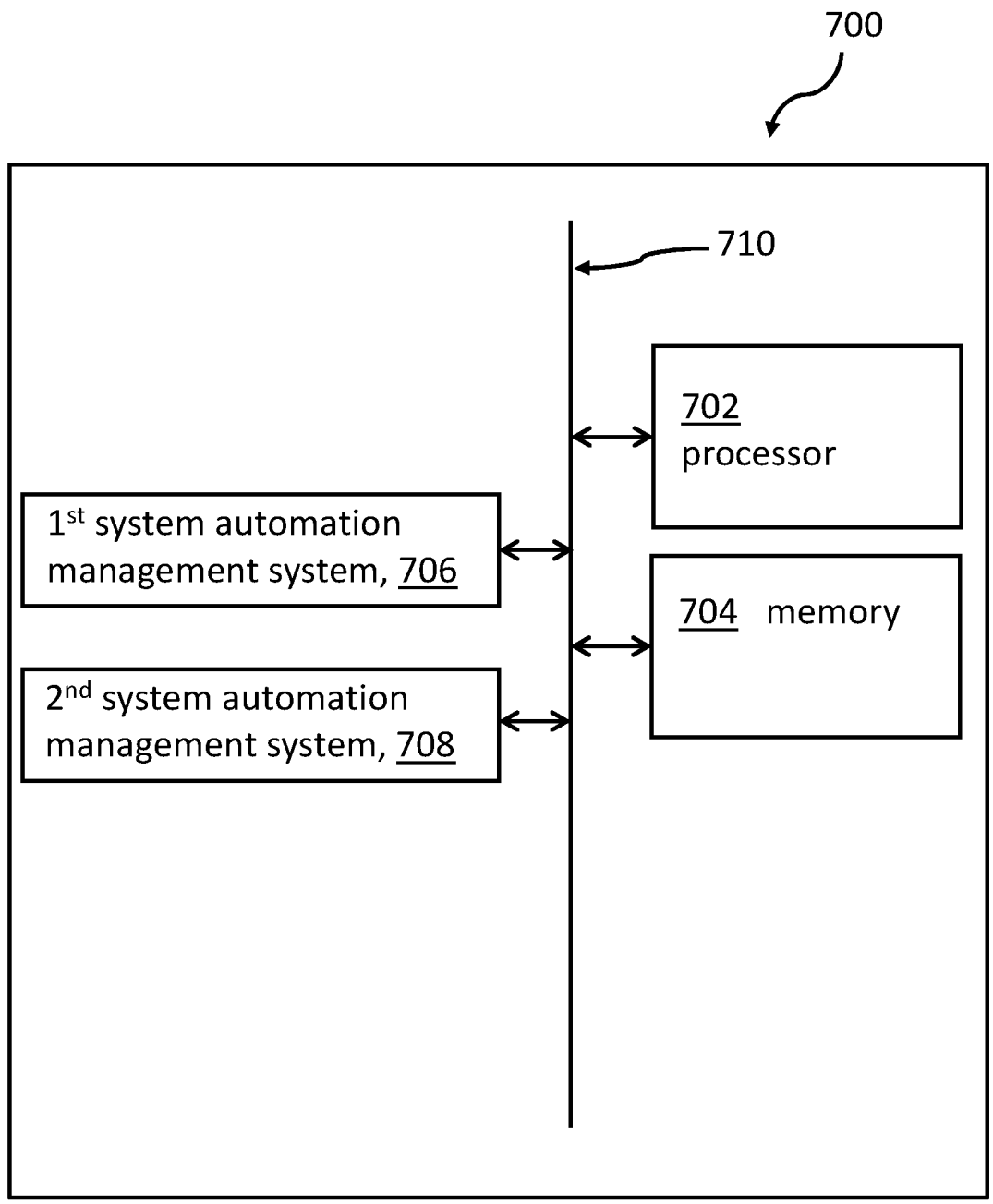
FIG. 7 is a swim diagram of the first embodiment method.

FIG. 7 shows a block diagram of an embodiment of the predicting system 700 for predicting an effect of an intervention on managed computing resources using a first system automation management system, comprising an automated operations controller and at least one automation agent. The predicting system 700 comprises a processor 702 and a memory 704, communicatively coupled to the processor 702, wherein the memory 704 stores program code portions that, when executed, enable the processor 702, to send—in particular, by the first second system automation management system, i.e., the first automation controller 706—state data of the first system automation management system to a second system automation management system 708—i.e., the second automation controller—which is a functional duplicate of the first system automation management system, send—in particular, by an agent 710—a status change command and a related expected response vector, equivalent to a result of the intervention to the second system automation management system 708, determine, by the second system automation management system 708, a predicted response vector of the managed computing resources in response to the received status change command, and responding, by the second system automation management system 708, with the determined response vector and a set of predicted actions derived therefrom.

Please note that all functional units, modules and functional blocks—i.e., the processor 702, the memory 704, the $1^{st}$ system automation management system 706 and the $2^{nd}$ system automation management system—may be communicatively coupled to each other for signal or message exchange in a selected 1:1 manner. Alternatively, the functional units, modules and functional blocks can be linked to a system internal bus system 710 for a selective signal or message exchange.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Figure 8:
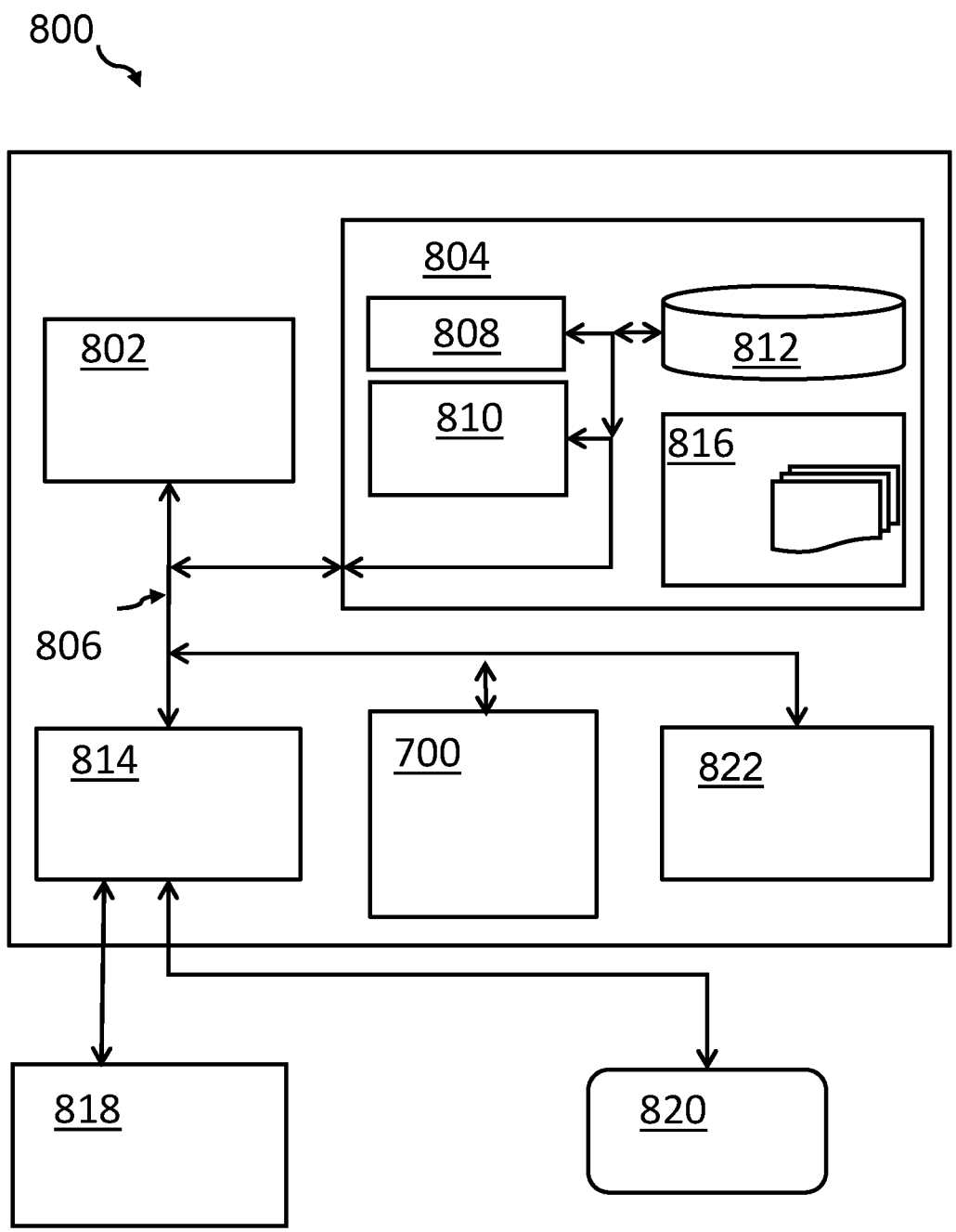
FIG. 8 is an example embodiment of a computing system comprising the predicting system according to FIG. 6.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general-purpose or special-purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random-access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc. Additionally, the predicting system 700 for predicting an effect of an intervention on managed computing resources may be attached to the bus system 806.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

In a nutshell, the inventive concept can be summarized by the following clauses:

1. A computer-implemented method for predicting an effect of an intervention on a managed computing resources using a first system automation management system, comprising an automated operations controller and at least one automation agent, the method comprising sending initial state data of the first system automation management system to a second system automation management system which is a functional duplicate of the first system automation management system, sending a status change command and a related expected response vector, equivalent to a result of the intervention to the second system automation management system, determining, by the second system automation management system, a predicted response vector of the managed computing resources in response to the received status change command, and responding, by the second system automation management system, with the determined response vector and a set of predicted actions derived therefrom.

2. The method according to clause 1, wherein the intervention is a status change to the managed computing resources or a detected unexpected result from the at least one automation agent of the first system automation management system.

3. The method according to clause 1 or 2, wherein the expected response vector and/or the predicted response vector is indicative for a current or future behavior of a set of resources of the first system automation management system.

4. The method according to any of the preceding clauses, wherein a managed computing resource is at least one selected out of the group comprising a process being executed on a hardware device, a hardware device and a sub-component thereof.

5. The method according to any of the preceding clauses, wherein the initial state data are derived from a snapshot of a current status of the first system automation management system.

6. The method according to any of the preceding clauses, wherein the set of predicted actions is indicative for operational commands to the managed computing resources.

7. The method according to any of the preceding clauses, wherein the expected response vector is a NULL vector.

8. The method according to any of the preceding clauses, wherein the expected response vector and the determined response vector is each a matrix representing different pretended or final outcomes for each resource, wherein each element of the matrix relates to a resource.

9. The method according to any of the preceding clauses, also comprising wherein the first system automation management system continues operation without any impact from the sending the status change and the related response vector to the second system automations management system.

10. The method according any of the preceding clauses, also comprising
streaming continuously the current state of the first system automation management system to the second system automation management system.

11. The method according to any of the preceding clauses, also comprising, wherein the response vector is a matrix representing a sequence of response vectors in time.

12. A predicting system for predicting an effect of an intervention on managed computing resources using a first system automation management system, comprising an automated operations controller and at least one automation agent, the predicting system comprising: a processor and a memory, communicatively coupled to the processor, wherein the memory stores program code portions that, when executed, enable the processor, to:
send initial state data of the first system automation management system to a second system automation management system which is a functional duplicate of the first system automation management system,
send a status change command and a related expected response vector, equivalent to a result of the intervention to the second system automation management system,
determine, by the second system automation management system, a predicted response vector of the managed computing resources in response to the received status change command, and
respond, by the second system automation management system, with the determined response vector and a set of predicted actions derived therefrom.

13. The predicting system according to clause 12, wherein the intervention is a status change to the managed computing resources or a detected unexpected result from the at least one automation agent of the first system automation management system.

14. The predicting system according to clause 12 or 13, wherein the expected response vector and/or the predicted response vector is indicative for a current or future behavior of a set of resources of the first system automation management system.

15. The predicting system according to any of the clauses 12 to 14, wherein a managed computing resource is at least one selected out of the group comprising a process being executed on a hardware device, a hardware device and a sub-component thereof.

16. The predicting system according to any of the clauses 12 to 15, wherein the initial state data are derived from a snapshot of a current status of the first system automation management system.

17. The predicting system according to any of the clauses 12 to 16, wherein the set of predicted actions is indicative for operational commands to the managed computing resources.

18. The predicting system according to any of the clauses 12 to 17, wherein the expected response vector is a NULL vector.

19. The predicting system according to any of the clauses 12 to 18, wherein the expected response vector and the determined response vector is each a matrix representing different pretended or final outcomes for each resource, wherein each element of the matrix relates to a resource.

20. A computer program product for predicting an effect of an intervention on a managed computing resources using a first system automation management system, comprising an automated operations controller and at least one automation agent, the computer program product comprising a computer readable storage medium having program instructions embodied therewith, the program instructions being executable by one or more computing systems or controllers to cause the one or more computing systems to:
send initial state data of the first system automation management system to a second system automation management system which is a functional duplicate of the first system automation management system,
send a status change command and a related expected response vector, equivalent to a result of the intervention to the second system automation management system,
determine, by the second system automation management system, a predicted response vector of the managed computing resources in response to the received status change command, and
responding, by the second system automation management system, with the determined response vector and a set of predicted actions derived therefrom.

What is claimed is:
1. A computer-implemented method for predicting an effect of an intervention on managed computing resources using a first system automation management system including an automated operations controller and at least one automation agent, the method comprising:
sending initial state data of the first system automation management system to a second system automation management system, the second system automation management system being a functional duplicate of the first system automation management system;
sending, by an automation agent, a status change command and a related expected response vector, equivalent to a result of the intervention, to the second system automation management system;
determining, by the second system automation management system, a predicted response vector of the man- aged computing resources in response to the received status change command; and responding, by the second system automation management system to the automation agent, with the predicted response vector and a set of predicted actions to maintain a stable state of the managed computing resources, the set of predicted actions including operational commands to the managed computing resources to avoid a potential effect the status change command may have on the managed computing resources, the potential effect being identified according to a simulated response matrix.

2. The method according to claim 1, wherein the intervention is a status change to the managed computing resources.

3. The method according to claim 1, wherein the expected response vector and/or the predicted response vector is indicative for a current or future behavior of a set of resources of the first system automation management system.

4. The method according to claim 1, wherein the managed computing resources are at least one resource selected out of the group of resources comprising a hardware device and a sub-component of a hardware device.

5. The method according to claim 1, wherein the initial state data are derived from a snapshot of a current status of the first system automation management system.

6. The method according to claim 1, wherein the expected response vector is a NULL vector.

7. The method according to claim 1, wherein the expected response vector and the predicted response vector is each a matrix representing different pretended or final outcomes for managed computing resources, wherein each element of the matrix relates to a computing resource of the managed computing resources.

8. The method according to claim 1, wherein the first system automation management system continues operation without any impact from the sending the status change command and the related response vector to the second system automation management system.

9. The method of claim 1, further comprising:
streaming continuously current state data of the first system automation management system to the second system automation management system.

10. The method of claim 1, wherein the predicted response vector is a matrix representing a sequence of response vectors in time.

11. The method of claim 1, wherein the intervention is a detected unexpected result from the at least one automation agent of the first system automation management system.

12. A predicting system for predicting an effect of an intervention on managed computing resources using a first system automation management system, comprising an automated operations controller and at least one automation agent, the predicting system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to predict an effect of an intervention on managed computing resources by:
sending initial state data of the first system automation management system to a second system automation management system, the second system automation management system being a functional duplicate of the first system automation management system;
sending, by an automation agent, a status change command and a related expected response vector, equivalent to a result of the intervention, to the second system automation management system;
determining, by the second system automation management system, a predicted response vector of the managed computing resources in response to the received status change command; and
responding, by the second system automation management system to the automation agent, with the predicted response vector and a set of predicted actions to maintain a stable state of the managed computing resources, the set of predicted actions including operational commands to the managed computing resources to avoid a potential effect the status change command may have on the managed computing resources, the potential effect being identified according to a simulated response matrix.

13. The predicting system according to claim 12, wherein the intervention is a status change to the managed computing resources or a detected unexpected result from the at least one automation agent of the first system automation management system.

14. The predicting system according to claim 12, wherein the expected response vector and/or the predicted response vector is indicative for a current or future behavior of a set of resources of the first system automation management system.

15. The predicting system according to claim 12, wherein the managed computing resources are at least one resource selected out of the group of resources comprising a hardware device and a sub-component of a hardware device.

16. The predicting system according to claim 12, wherein the initial state data are derived from a snapshot of a current status of the first system automation management system.

17. The predicting system according to claim 12, wherein the expected response vector is a NULL vector.

18. The predicting system according to claim 12, wherein the expected response vector and the predicted response vector is each a matrix representing different pretended or final outcomes for managed computing resources, wherein each element of the matrix relates to a computing resource of the managed computing resources.

19. A computer program product for predicting an effect of an intervention on managed computing resources using a first system automation management system, comprising an automated operations controller and at least one automation agent, the computer program product comprising a computer-readable storage medium having a set of instructions stored therein which, when executed by a processor, causes the processor to predict an effect of an intervention on a managed computing resource by:
sending initial state data of the first system automation management system to a second system automation management system, the second system automation management system being a functional duplicate of the first system automation management system;
sending, by an automation agent, a status change command and a related expected response vector, equivalent to a result of the intervention, to the second system automation management system;
determining, by the second system automation management system, a predicted response vector of the managed computing resources in response to the received status change command; and responding, by the second system automation management system to the automation agent, with the predicted response vector and a set of predicted actions to maintain a stable state of the managed computing resources, the set of predicted actions including operational commands to the managed computing resources to avoid a potential effect the status change command may have on the managed computing resources, the potential effect being identified according to a simulated response matrix.

20. The computer program product of claim 19, wherein the intervention is a detected unexpected result from the at least one automation agent of the first system automation management system.

* * * * *